(12) United States Patent
Ishiyama et al.

(10) Patent No.: US 8,566,587 B2
(45) Date of Patent: Oct. 22, 2013

(54) NETWORK SYSTEM AND METHOD FOR OPERATING NETWORK SYSTEM

(75) Inventors: Masahiro Ishiyama, Kawasaki (JP); Atsushi Inoue, Kawasaki (JP); Nobuo Okabe, Tokorozawa (JP); Shoichi Sakane, Akishima (JP)

(73) Assignees: Kabushiki Kaisha Toshiba, Tokyo (JP); Yokogawa Electric Corporation, Tokyo (JP)

( * ) Notice: Subject to any disclaimer, the term of this patent is extended or adjusted under 35 U.S.C. 154(b) by 1495 days.

(21) Appl. No.: 11/420,917

(22) Filed: May 30, 2006

(65) Prior Publication Data

US 2006/0271782 A1    Nov. 30, 2006

(30) Foreign Application Priority Data

May 31, 2005  (JP) ................................. 2005-160519

(51) Int. Cl.
*H04L 29/06* (2006.01)
(52) U.S. Cl.
USPC ............. 713/168; 713/169; 713/170; 726/10; 380/259; 380/260; 380/278; 380/279
(58) Field of Classification Search
USPC ............. 713/168, 169, 170; 726/10; 380/259, 380/260, 278, 279
See application file for complete search history.

(56) References Cited

U.S. PATENT DOCUMENTS

| | | | |
|---|---|---|---|
| 7,120,692 B2* | 10/2006 | Hesselink et al. | 709/225 |
| 2001/0052083 A1* | 12/2001 | Willins et al. | 713/201 |
| 2003/0016668 A1* | 1/2003 | Mugica et al. | 370/392 |
| 2005/0135271 A1 | 6/2005 | Inoue et al. | |
| 2005/0265546 A1* | 12/2005 | Suzuki | 380/44 |
| 2006/0015602 A1 | 1/2006 | Inoue et al. | |
| 2006/0174102 A1* | 8/2006 | Smith et al. | 713/150 |

OTHER PUBLICATIONS

S. Kent, R. Atkinson, rfc2401, Security Architecture for the Internet Protocol, Nov. 1998, Network Working Group, www.ietf.org—The Internet Engineering Task Force.*
J. Kohl, C. Neuman, rfc1510, The Kerberos Network Authentication Service (V5), Sep. 1993, Network Working Group, www.ietf.org—The Internet Engineering Task Force.*
J. Kohl, et al., "The Kerberos Network Authentication Service", RFC1510, V5, Sep. 1993, 73 pages.
S. Kent, et al., "Security Architecture for the Internet Protocol", RFC 2401, Nov. 1998, 41 pages.
R. Droms, "Stateless Dynamic Host Configuration Protocol (DHCP) Service for IPv6", RFC3736, Apr. 2004, 6 pages.

* cited by examiner

*Primary Examiner* — Bradley Holder
(74) *Attorney, Agent, or Firm* — Oblon, Spivak, McClelland, Maier & Neustadt, L.L.P.

(57) ABSTRACT

A control network system connected with a node having a unique identifier includes a KDC4B for distributing a first key to the node for cryptographic communication, a PS4B for supplying a function name and a second key corresponding to the unique identifier to the node by the cryptographic communication using the first key, and a PS for supplying the node with setting information used for the cryptographic communication using the second key in response to a request using the function name.

14 Claims, 6 Drawing Sheets

NETWORK SYSTEM AND METHOD FOR OPERATING NETWORK SYSTEM

CROSS-REFERENCE TO RELATED APPLICATIONS

This application is based upon and claims the benefit of priority from prior Japanese Patent Application No. 2005-160519, filed May 31, 2005, the entire contents of which are incorporated herein by reference.

BACKGROUND OF THE INVENTION

1. Field of the Invention

The present invention relates to a control network system and the device setting on the control network system.

2. Description of the Related Art

In recent years, the use of the Internet, the world's largest computer network, has been extended to such a degree that the information and services disclosed on the Internet are routinely utilized by and provided to external users accessing the Internet. New technologies for using the Internet have been developed and new computer businesses have been developed.

In the control network used for equipment control of buildings, as well as in the ordinary computer network, on the other hand, the employment of an IP-compatible control system has increased the demand for the IP compatibility of the end devices. Under the circumstances, however, the IP compatibility is limited to the simple IP introduction in the network layer, and the device control protocol remains unchanged in many cases. Also, no sufficient consideration is given for security and protection.

Many devices for control equipment have no sufficient user interface (UI) like personal computers (PCs) on the one hand, and the IP compatibility requires the network setting of each device on the other hand. Once all the nodes on the control network become IP compatible, a great number of nodes are required to be set. In such a case, the method of physically connecting and setting individual nodes is expensive. The automatic setting by use of a network, on the other hand, poses the security problem.

In the device installation in the conventional control system network, the devices are often required to be arranged according to the network design, and in some cases, a given device having a unique ID is always required to be located at a designated position. This poses the problem of complicating the actual construction work further.

It is preferable, therefore, that a great number of inexpensive control devices having no sufficient user interface can participate in the control network system having a sufficient security and protection mechanism. Also, preferably, the information requiring the previous setting in each node are as small in amount as possible, and each device can be set safely and easily from the control network.

BRIEF SUMMARY OF THE INVENTION

One aspect of the present invention is directed to a network system connected with a node having a unique identifier. In the network system, a first distribution device issues a first key for cryptographic communication, and distributes the first key to the node. A first supply device supplies a function name and a second key corresponding to the unique identifier to the node by the cryptographic communication using the first key. A second supply device supplies the node with setting information used for the cryptographic communication using the second key, in accordance with a request using the function name from the node.

DETAILED DESCRIPTION OF THE INVENTION

Embodiments of the present invention are described below with reference to the drawings.

Figure 1:
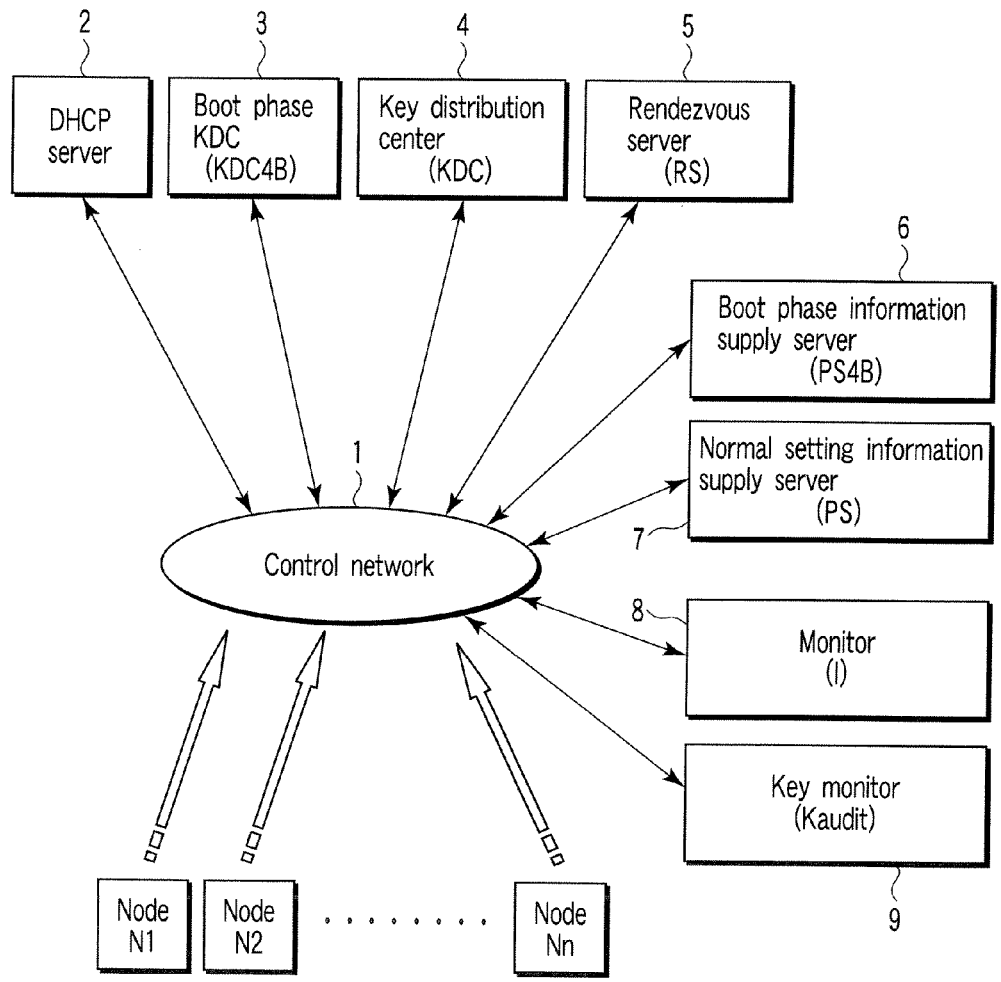
FIG. 1 is a diagram showing a configuration of a control network according to an embodiment of the present invention.

FIG. 1 is a diagram showing a configuration of a control network according to an embodiment of the invention. A control network 1 according to this embodiment includes a DHCP server 2, a boot phase key distribution center (KDC4B) 3, a key distribution center (KDC) 4, a rendezvous server (RS) 5, a boot phase information supply server (PS4B) 6, a normal setting information supply server (PS) 7, a monitor (I) 8 and a key monitor (Kaudit) 9.

This control network 1 is connected with a plurality of nodes (N1, N2, ..., Nn) each constituting a device.

Figure 2:
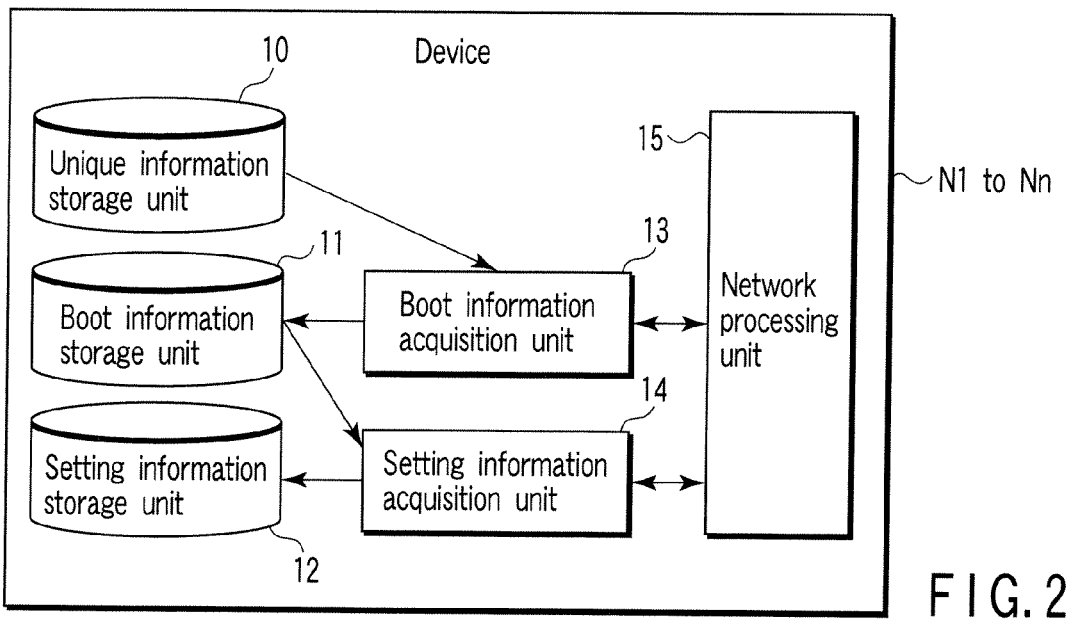
FIG. 2 is a block diagram showing a configuration of each device (node)

FIG. 2 is a block diagram showing a device (node) configuration. The devices N1 to Nn each include a unique information storage unit 10, a boot information storage unit 11 and a setting information storage unit 12. Each device also includes a boot information acquisition unit 13 for acquiring the boot information from the boot phase information supply server (PS4B) 6 and writing the boot information in the boot information storage unit 11, and a setting information acquisition unit 14 for acquiring the setting information from the normal setting information supply server (PS) 7 and writing the setting information in the setting information storage unit 12. Also, each device includes a network processing unit 15 providing a function as a normal IP network device and taking charge of communication processing utilizing KDC.

Figure 3:
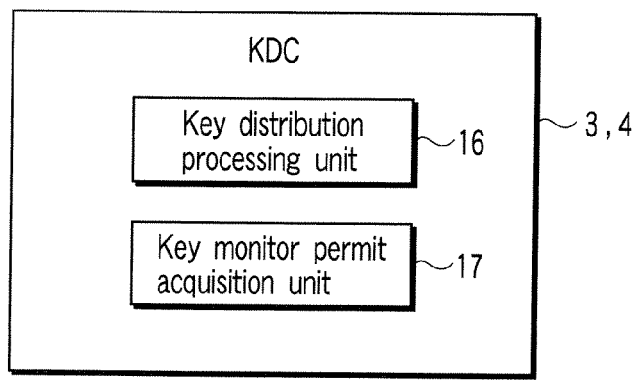
FIG. 3 is a block diagram showing a configuration of a key distribution center (KDC)
Figure 4:
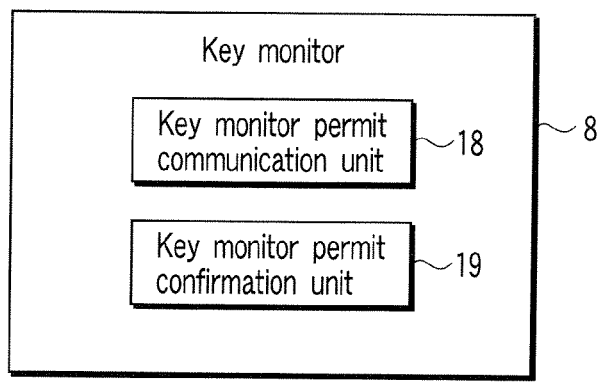
FIG. 4 is a block diagram showing a configuration of a key monitor.
Figure 5:
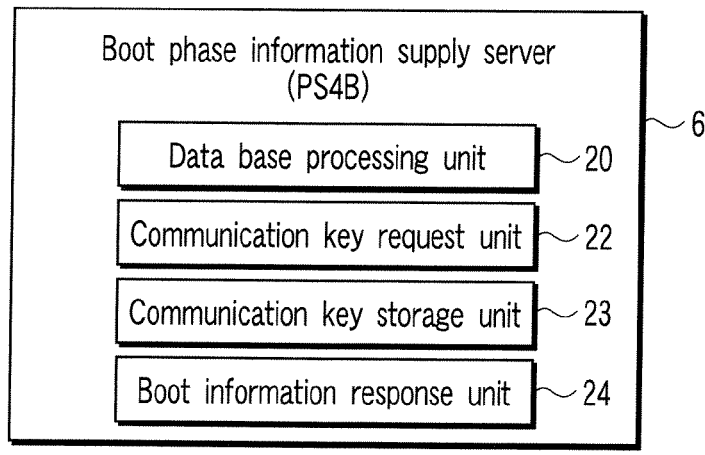
FIG. 5 is a block diagram showing a configuration of a boot phase information supply server (PS4B)

FIG. 3 is a block diagram showing a configuration of the key distribution center (KDC). As described above, the KDC is divided into a boot phase KDC (KDC4B) 3 and a normal KDC 4. The KDC 3, 4 each includes a key distribution processing unit 16 and a key monitor permit acquisition unit 17 as units for realizing the function of an ordinary key distribution center. The rendezvous server (RS) 5 is implemented by using the DNS (domain name service) technique, for example. FIG. 4 is a block diagram showing a configuration of the key monitor. The key monitor 8 includes a key monitor permit communication unit 18 and a key monitor permit confirmation unit 19. FIG. 5 is a block diagram showing a configuration of the boot phase information supply server (PS4B). The boot phase information supply server (PS4B) 6 includes a data base processing unit 20 having an ordinary data base function, a communication key request unit 22, a communication key storage unit 23 and a boot information response unit 24.

In the network design for the conventional control system, a device having a given unique ID (or address) is often required to be located always at a designated position. This is a very bothersome job in actual construction work.

Consider a case, for example, in which ten air conditioners of the same type exist as devices. The job of installation and operation of these air conditioners involves three parties including a designer of the control network of the particular building (hereinafter referred to as "the designer"), a construction company for conducting the construction work for physically installing the air conditioners (hereinafter referred to as "the construction company") and a vendor for manufacturing the air conditioners (hereinafter referred to as "the vendor").

Conventionally, the designer is informed of the unique ID of a particular device (such as an air conditioner) and designs a control network based on the unique ID. The construction company installs a designated device at a designated position. In the case where there exist ten air conditioners of the same type, however, "which air conditioner is to be installed where?" is required to be taken into consideration.

In the absence of a control network design, a particular air conditioner to be installed can be randomly selected from a group of air conditioners in stock. Assume, however, that an air conditioner to be installed on the tenth floor is installed erroneously on the ninth floor, and an air conditioner to be installed on the ninth floor is erroneously installed on the tenth floor. This is correct in terms of construction design but incorrect in terms of network, and therefore the reconstruction is required. The requirement of reconstruction cannot be understood by a person not equipped with the information on the specifics of the control network design.

According to an embodiment of the invention, the individual devices N1 to Nn in the configuration shown in FIG. 1 are assigned unique IDs (identifiers) and function names, respectively, that can be managed independently of each other. The unique ID is an identifier assigned by the vendor, and the function name is an identifier assigned by the designer of the control network 1. The aforementioned problem is solved by relating these two identifiers to each other by use of the control network 1 after the physical construction work.

First, the vendor embeds a unique ID in each of the devices (air conditioners) N1 to Nn. A conceivable specific example of the unique ID is a serial number or the MAC address of Ethernet (trade mark).

Figure 6:
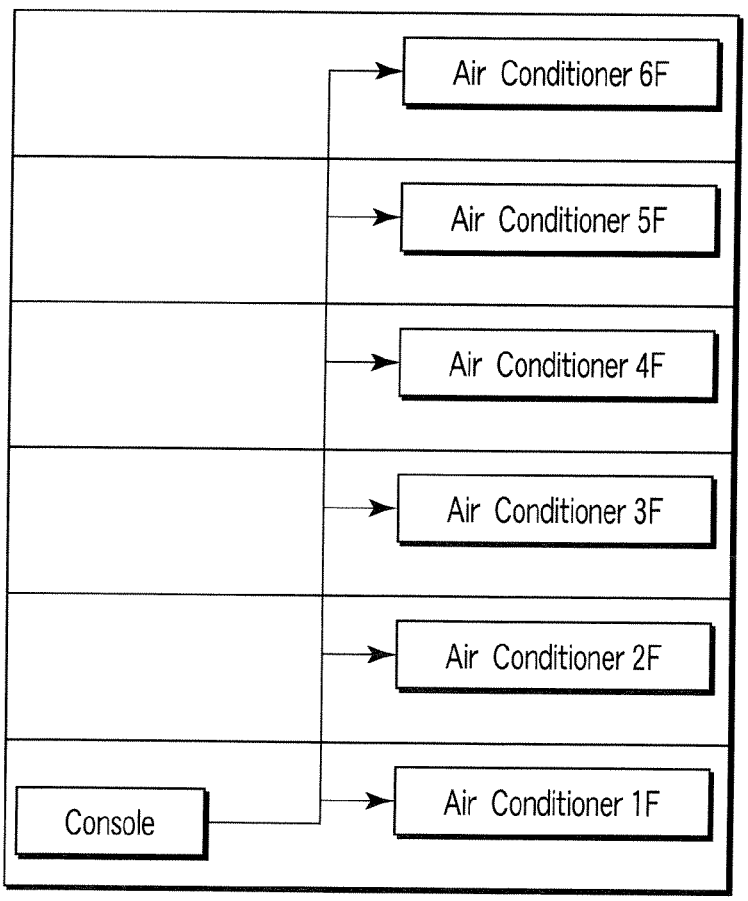
FIG. 6 is a diagram showing a design example of a control network.

The construction company can randomly arrange, for example, ten air conditioners of the same type to be connected to the control network 1. The designer of the control network 1, on the other hand, designs the control network 1 using the function names such as "AirConditioner1F" or "AirConditioner2F" in advance. A design example of the control network is shown in FIG. 6. The control network 1 is designed, for example, to control "AirConditioner1F" to "AirConditioner6F" from a console installed on the first floor.

The devices N1 to Nn are each assumed to have embedded therein a unique name (ID) and a boot phase key (boot key). In the case where these devices are connected as nodes to the control network 1, the function name (Dname) on the control network 1 and the communication key used for all subsequent communications are obtained on the basis of the unique ID. This stage is called "the boot phase". Based on this function name, the nodes N1 to Nn acquire the setting information on the control network 1. This phase is called "the initialize phase". For security reason, in the boot and initialize phases, the IPsec communication (cryptographic communication) based on the Kerberos authentication is employed. For the detailed information on Kerberos authentication, refer to "RFC1510: The Kerberos Network Authentication Service (VS). J. Kohl, C. Neuman. September 1993", the entire contents of which are incorporated herein by reference.

According to an embodiment of this invention, the designer can design the control network 1 in the name given by himself/herself. The construction company can install the devices N1 to Nn without considering the unique names thereof. The vendor can produce and keep in stock the devices without considering the destination of shipment of the devices.

The unique ID and the boot phase key (boot key) are required to be embedded in each of the devices N1 to Nn in order to permit the devices to be produced independently of the control network 1 in which they are arranged, and the device vendor can simply bury them.

The device user (construction company, etc.) acquires the boot key from the vendor and sets it in the boot phase KDC (KDC4B) 3. As an alternative, in the case where comparatively important devices few in number are involved, a default key can be set using the physical contact, etc. without using the default key of the vendor.

Finally, which unique ID is related to which function name is required to be set in the boot phase information supply server (PS4B) 6. The prerequisite for this is the physical confirmation and setting by the construction company. In the case where the device positions can be automatically detected (by connection to a switch, for example), however, the aforementioned relation can be set automatically based on the automatic device position detection.

Figure 7:
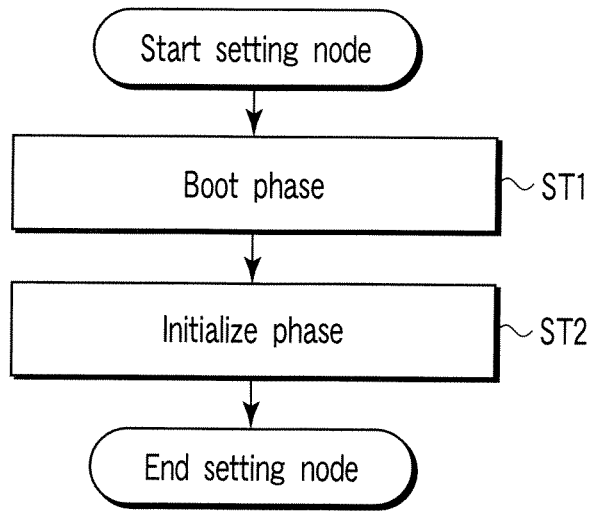
FIG. 7 is a flowchart showing the node setting flow according to an embodiment of the present invention.

FIG. 7 is a flowchart showing the flow of node setting according to this embodiment. As described above, the node setting is roughly divided into the boot phase ST1 and the initialize phase ST2.

Figure 8:
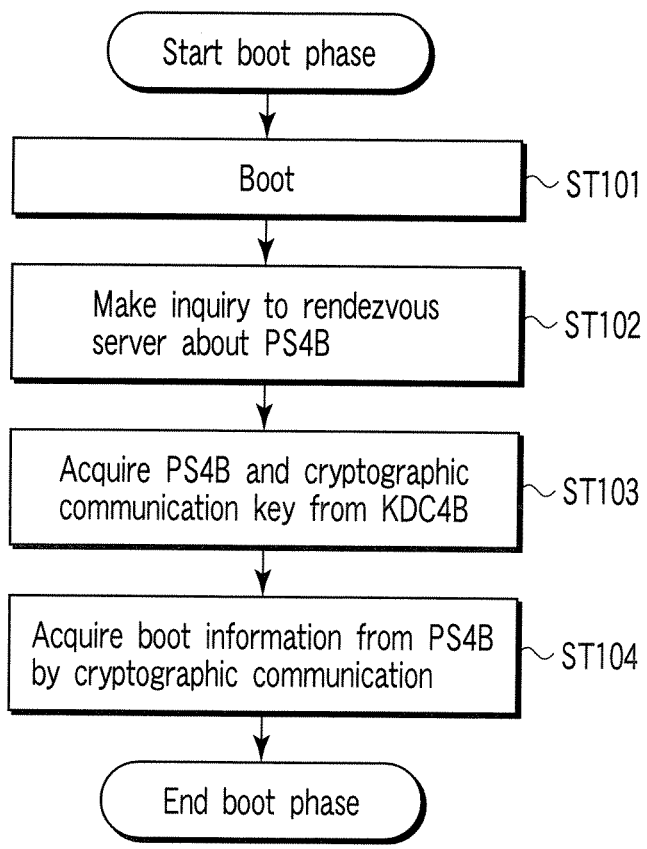
FIG. 8 is a flowchart showing the node (device) operation in the boot phase.
Figure 9:
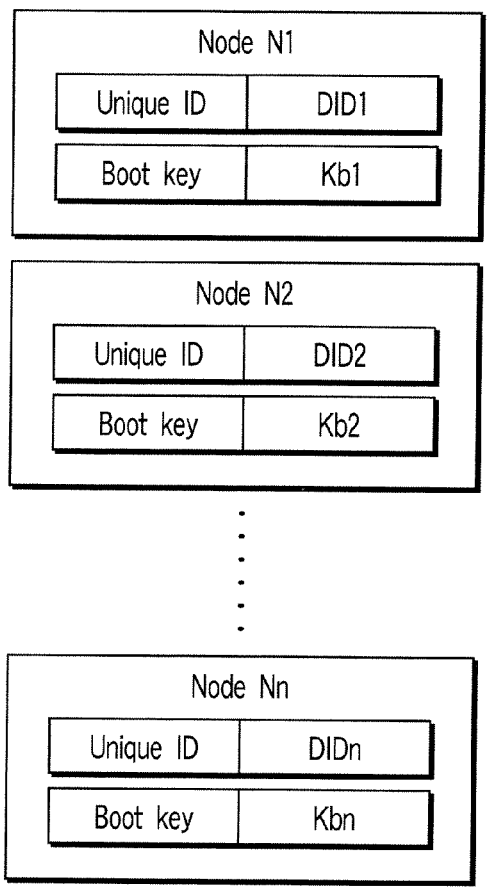
FIG. 9 is a diagram showing a unique ID and a boot key preset in each node.

FIG. 8 is a flowchart showing the node (device) operation in the boot phase, and FIG. 9 a diagram showing the unique ID and the boot key preset in each node. As shown in FIG. 9, the node N1 has DID1 as a unique ID and Kb1 as a boot key, the node N2 has DID2 as a unique ID and Kb2 as a boot key, and the node Nn has DIDn as a unique ID and Kbn as a boot key.

The method of operation of the control network 1 before the node N1, for example, is set in the control network 1 will be described.

As shown in FIG. 8, upon booting of the node N1 at step ST101, the node N1 sends a DHCP request to the DHCP server 2. In response, the DHCP server 2 notifies the node N1 of the address of the boot phase KDC (KDC4B) 3, the information (for example, Kerberos realm) on the boot phase KDC (KDC4B) 3, the address of the rendezvous sever 5 and the address of a time sync server (not shown). The node N1 adjusts the timing thereof by accessing the time sync server.

Next, at step ST102, the boot information acquisition unit 13 of the node N1 makes an inquiry to the rendezvous server 5 about the boot phase information supply server (PS4B) 6 capable of responding to the node N1. Assume, for example, that the rendezvous server 5 uses the DNS, the unique ID (DID) is the MAC address based on EUI-64 of IEEE, and the value of DID1 is "0123:4567:89ab:cdef". The unique ID (DID1) is set in advance in the unique information storage unit 10 of the node N1. In the process, the value of DID1 is delivered to the rendezvous server 5 as a search key. Also, the domain name for the boot phase is added. This domain name can be supplied also at the time point of DHCP. Assuming that the domain name for the boot phase is "boot.local", the search key for DNS is "f.e.d.c.b.a.9.8.7.6.5.4.3.2.1.0.boot.local".

The rendezvous server 5 returns the address of the information supply server (PS) corresponding to the particular search key to the node N1. In this stage, the boot phase is identified by the search key, and the address of the boot phase information supply server (PS4B) 6 corresponding to the designated unique ID (DID1) is returned. Specifically, the rendezvous server (RS) 5 may return either the address of the boot phase information supply server (PS4B) 6 or the ID convertible to an address, such as the fully qualified domain name (FQDN).

Next, at step ST103, the node N1 requests a key from the boot phase KDC (KDC4B) 3 to conduct security communication with the boot phase information supply server (PS4B) 6. In the process, the cryptographic communication between the node N1 and the boot phase KDC (KDC4B) 3 uses the boot key Kb1. According to this embodiment using Kerberos authentication, a ticket is issued first through the mutual authentication with the boot phase KDC (KDC4B) 3, and then the communication key is supplied.

Next, at step ST104, the boot information acquisition unit 11 of the node N1 conducts the mutual authentication with the boot phase information supply server (PS4B) 6 using the ticket and the key obtained from the boot phase KDC (KDC4B) 3, and by cryptographic communication, requests the boot information such as the function name and the communication key. At the same time, the node N1 informs the boot phase information supply server (PS4B) 6 that the node N1 is DID1.

The fact that the unique ID, i.e. DID1 of the node N1 is the function name Dname1 is assumed to be preset in the boot phase information supply server (PS4B) 6. In the boot phase information supply server (PS4B) 6, upon receipt of the request for the boot information, the communication key request unit 22 requests the issue of the communication key of Dname1 from the key distribution center (KDC) 4. Incidentally, it is assumed that the reliability is established and the cryptographic communication is possible between the key distribution center (KDC) 4 and the boot phase information supply server (PS4B) 6.

In the key distribution center (KDC) 4, upon receipt of the communication key issue request, the key monitor permit acquisition unit 17 seeks the approval of the key monitor (Kaudit) 8. The key monitor permit communication unit 18 of the key monitor (Kaudit) 8, upon receipt of the approval request, makes an inquiry to the key monitor permit confirmation unit 19 about whether the communication key for which the approval is requested can be issued or not. The issue permit can be either automatically determined in accordance with the existing conditions by the program of the key monitor permit confirmation unit 19 as in this embodiment, or by the human being. Once the issue of the communication key is permitted, the key monitor permit communication unit 19 notifies the fact as a reply to the key distribution center (KDC) 4. Upon detection of some illegal information regarding the approval request, the key monitor (Kaudit) 8 issues no key permit (prohibits the key permit) to the key distribution center (KDC) 4.

The key distribution center (KDC) 4, upon receipt of the communication key issue permit from the key monitor (Kaudit) 8, generates a communication key KN1, and the key distribution processing unit 16 informs KN1 as a communication key of Dname1 to the boot phase information supply server (PS4B) 6. At the same time, the key distribution center (KDC) 4 stores KN1 as a communication key of Dname1.

In the boot phase information supply server (PS4B) 6, upon receipt of the communication key KN1 from the key distribution center (KDC) 4, the boot information response unit 24 notifies the function name Dname1, the communication key KN1 and, if required, other information to the node N1. The communication key KN1 issued is held in the communication key storage unit 23.

Figure 10:
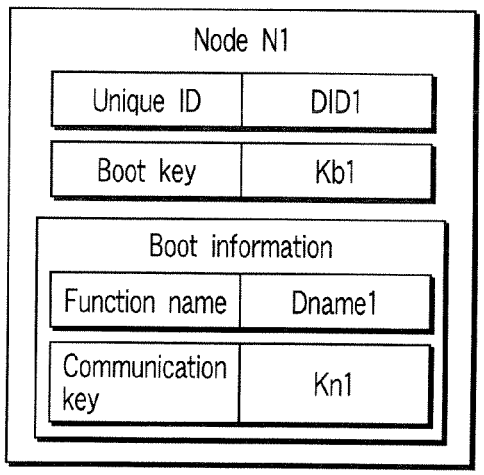
FIG. 10 is a diagram showing the information stored in a node N1 in the boot phase.

As a result, as shown in FIG. 10, the boot information including the function name (Dname1) and the communication key (KN1) is applied to the node N1 and stored in the boot information storage unit 11 of the node N1. For this purpose, a nonvolatile storage means is used from the viewpoint of security.

Figure 11:
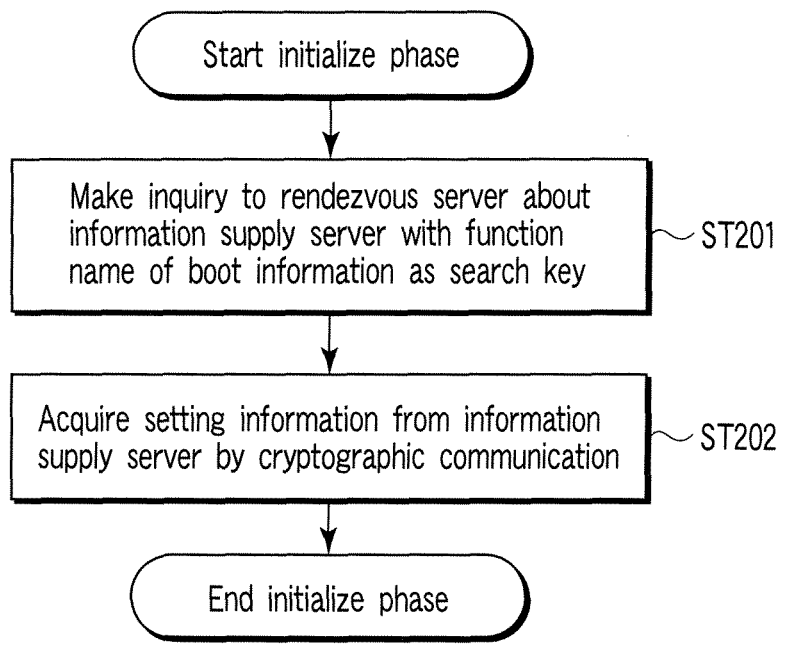
FIG. 11 is a flowchart showing the node (device) operation in the initialize phase.

FIG. 11 is a flowchart showing the node (device) operation in the initialize phase.

First, at step ST201, the setting information acquisition unit 14 of the node N1 announces the function name Dname1 as a search key to the rendezvous server 5, and makes an inquiry about the information supply server assigned to the function name Dname1. The rendezvous server 5, in response to this inquiry, returns the address of the information supply server (PS) corresponding to the given search key. The initialize phase is determined by the search key, and the address of the normal setting information supply server (PS) 7 corresponding to the designated function name Dname1 is returned. Specifically, the rendezvous server (RS) 5 may return either the address of the normal setting information supply server (PS) 7 or the ID convertible to the address such as the fully qualified domain name (FQDN).

Next, at step ST202, the setting information acquisition unit 14 of the node N1 acquires the setting information by accessing the normal setting information supply server (PS) 7 specified based on the address returned from the rendezvous server (RS) 5. The setting information is used for the cryptographic communication using the communication key KN1 while the particular node performs the function corresponding to the function name.

Figure 12:
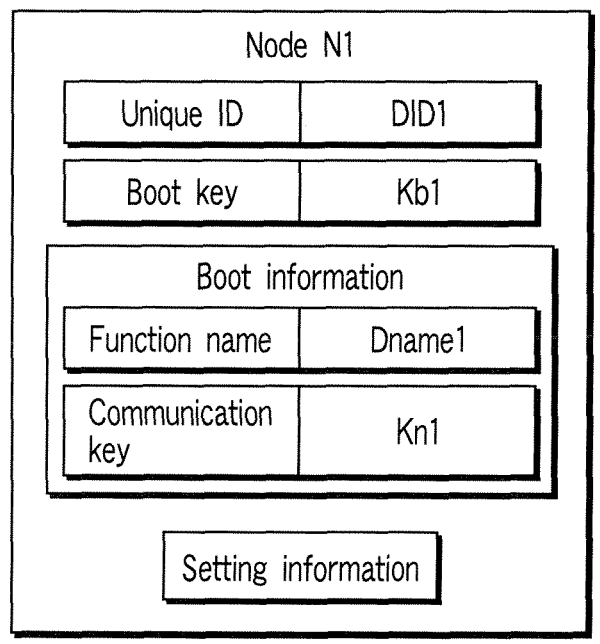
FIG. 12 is a diagram showing the information stored in the node N1 in the initialize phase.

As shown in FIG. 12, therefore, the setting information is applied to the node N1, and stored in the setting information storage unit 12 of the node N1. A nonvolatile memory is used for the setting information storage unit 12, if possible, for security reason.

Now, the initialize phase is over, the node N1 is completely set up.

The monitor I1 associated with the KDC4 like the node N1 may transmit a life-confirming message at regular time intervals to Dname1 (i.e. the node N1). In the process, the monitor I1 confirms the life using the encrypted communication path. In the case where no response is given to the life confirmation, the device having the function name Dname1 can know that the communication with KDC4 is impossible or otherwise a security fault has occurred, and therefore issues an alarm.

Although the foregoing description reefers to the node N1, the other nodes N2, N3, . . . , Nn can be set up by the same operation as the node N1.

It will thus be understood from the foregoing description of the embodiments of the invention, that the nodes can be set safely and inexpensively even for the control network having a great number of nodes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A network system connected with a node having a unique identifier, comprising:
 a first distribution computing device configured to issue a first key for first key based cryptographic communication, and distribute the first key to the node;
 a first supply computing device configured to supply the node, using the first key based cryptographic communication, with a function name of the node and a second key corresponding to the unique identifier and associated with the node, the function name being stored at the node after the function name is supplied to the node by the first supply computing device; and
 a second supply computing device configured to supply the node, in response to the first supply computing device supplying the node with the function name and the second key, with setting information, the setting information enabling second key based cryptographic communication, in response to a request using the function name from the node, wherein
 the first supply computing device is configured to store the unique identifier and the function name in association with each other, the unique identifier corresponding to an identifier of the node assigned by a vendor of the node, and the function name corresponding to an identifier of the node assigned by a designer of the network system, and
 the unique identifier and the function name are different from each other.

2. The network system according to claim 1, further comprising a first monitoring computing device configured to prohibit the first distribution computing device from issuing of the first key, when illegal information regarding an approval request for the first key is detected.

3. The network system according to claim 1, further comprising a second distribution computing device configured to issue a communication key corresponding to the function name, and distribute the communication key as the second key to the first supply computing device.

4. The network system according to claim 3, further comprising a second monitoring computing device configured to prohibit the second distribution computing device from issuing of the second key, when illegal information regarding an approval request for the second key is detected.

5. The network system according to claim 1, further comprising a third monitoring computing device configured to monitor the node in order to determine a security fault of the node by transmitting a life-confirming message to the node and determining the presence or absence of a response from the node to the life-confirming message.

6. The network system according to claim 1, wherein the node has embedded therein a boot phase key for cryptographic communication with the first distribution computing device.

7. The network system according to claim 1, wherein
 the first distribution computing device distributes the first key to the node using third key based cryptographic communication, in response to a request from the node, and
 a third key for the third key based cryptographic communication is stored at the node.

8. The network system according to claim 1, wherein
 the first supply computing device, the second supply computing device, and the node are different from each other.

9. A method for operating a network system connected to a node having a unique identifier, comprising:
 issuing a first key for first key based cryptographic communication by a first distribution device, and distributing the first key from the first distribution device to the node;
 supplying, using the first key based cryptographic communication, a function name of the node and a second key corresponding to the unique identifier and associated with the node, from a first supply device to the node, the unique identifier and the function name being stored at the first supply device in association with each other, the unique identifier corresponding to an identifier of the node assigned by a vendor of the node, and the function name corresponding to an identifier of the node assigned by a designer of the network system, the unique identifier and the function name being different from each other, and the function name being stored at the node after the function name is supplied to the node by the first supply device; and
 supplying, in response to the first supply device supplying the node with the function name and the second key, setting information, the setting information enabling second key based cryptographic communication, from a second supply device to the node, in response to a request using the function name from the node.

10. The method according to claim 9, further comprising prohibiting the first distribution device from issuing of the first key, when illegal information regarding an approval request for the first key is detected.

11. The method according to claim 9, further comprising issuing, by a second distribution device, a communication key corresponding to the function name, and distributing the communication key as the second key to the first supply device.

12. The method according to claim 11, further comprising prohibiting the second distribution device from issuing of the second key, when illegal information regarding an approval request for the second key is detected.

13. The method according to claim 9, further comprising monitoring the node in order to determine a security fault of the node by transmitting a life-confirming message to the node and determining the presence or absence of a response from the node to the life-confirming message.

14. The method according to claim 9, wherein the node has embedded therein a boot phase key for cryptographic communication with the first distribution device.

* * * * *